United States Patent [19]

Geus et al.

[11] Patent Number: 4,869,792

[45] Date of Patent: Sep. 26, 1989

[54] ELECTROCHEMICAL PROCESS FOR PRODUCING CATALYSTS

[75] Inventors: John W. Geus, Bilthoven; Peter C. M. Van Striphout, Helmont; Frederick Versluis, Lopik, all of Netherlands

[73] Assignee: Harshaw Chemie B.V., Strijkviertel, Netherlands

[21] Appl. No.: 161,406

[22] Filed: Feb. 23, 1988

Related U.S. Application Data

[63] Continuation of Ser. No. 930,128, Nov. 12, 1986, abandoned.

[30] Foreign Application Priority Data

Nov. 11, 1985 [NL] Netherlands ......................... 8503091

[51] Int. Cl.$^4$ .......................... C25B 1/00; B01J 37/03
[52] U.S. Cl. ........................................ 204/96; 204/44; 204/45.1; 204/48; 204/49; 204/52.1; 204/55.1; 502/244; 502/247; 502/258; 502/259; 502/335; 502/342; 502/346
[58] Field of Search .................... 204/96, 45.1, 48, 49; 502/244, 247, 258, 259, 335, 342, 346

[56] References Cited

U.S. PATENT DOCUMENTS

| | | | |
|---|---|---|---|
| 4,462,875 | 7/1984 | Stutts | 204/96 |
| 4,472,533 | 9/1984 | Moskovits | 502/320 |
| 4,474,653 | 10/1984 | Beer et al. | 204/96 |
| 4,490,219 | 12/1984 | Bindra | 204/23 |
| 4,540,476 | 9/1985 | Dyer | 204/96 |

FOREIGN PATENT DOCUMENTS 531105 12/1940 United Kingdom .

*Primary Examiner*—John F. Niebling
*Assistant Examiner*—David G. Ryser
*Attorney, Agent, or Firm*—Woodcock Washburn Kurtz Mackiewicz & Norris

[57] ABSTRACT

A process for producing catalysts, in which an active component or a compound to be converted into an active component is obtained or deposited on a carrier material, using deposition-precipitation. According to the invention, the formula of a carrier material, which may or may not be catalytically active, and/or the precipitation of the active component or a compound to be converted into such active component on a carrier material is effected by means of an electrochemical reaction.

15 Claims, No Drawings

ELECTROCHEMICAL PROCESS FOR PRODUCING CATALYSTS

This is a continuation of application Ser. No. 930,128, filed Nov. 12, 1986, now abandoned.

This invention relates to a process for producing catalysts, in which an active component or a compound to be converted into the active component ("precursor") is obtained or deposited on a carrier material by means of deposition-precipitation.

Generally speaking, the activity of solid catalysts resides in the surface of the solid. Therefore, in many cases, the activity of a catalyst is determined by the surface area of the catalytically active compound per unit volume of the catalyst and by the accessibility of the active surface to reactants. In many cases, besides its activity, the selectivity of a catalyst is of prime importance. The selectivity of a catalyst means that the catalyst system only accelerates a desired reaction and does not accelerate other thermodynamically possible, but undesirable reactions to any appreciable or to the same extent. In addition to the nature and area of the catalytically active surface, the accessibility of this surface to reactants and the velocity at which reaction products can be discharged from the catalyst are often of importance.

Generally speaking, the required activity, and hence the required active surface area per unit volume, can only be obtained when the catalytically active solid is used in the form of small to extremely small particles. As, under the conditions in which many catalytic reactions are carried out, catalytically active solids mostly become sintered rapidly, the catalytically active material by itself will only seldom suffice. Furthermore, in cases in which the catalytic reaction is carried out under conditions in which the solid is not sintered at a prohibitively high rate, the pore structure is mostly so unfavourable that accessibility to reactants and/or discharge velocity of reaction products is insufficient.

To meet the above objections of low thermal stability and poor transport characteristics, technical solid catalysts are virtually always used on a so-called support or carrier material. In most cases the surface of the carrier material proper is not catalytically active, although there is an important category of catalysts ("bifunctional reforming catalyst in which the carrier also contributes to the catalytic activity. The carrier is thermostable, which means that even when kept at high temperature for a prolonged period of time, it does not excessively deteriorate in structure and in particular in surface structure. In addition, the carrier may be given a pore structure which is suitable for the above fast transport of reactants and reaction products.

One of the major problems in producing technical-grade catalysts is the uniform application, in finely-divided form, of a catalytically active compound or a compound to be converted into a catalytically active component (a so-called precursor) to the carrier material. The processes used therefor on a technical scale can be distinguished into two types. In one process, the starting material is an existing carrier material, to which the active component of the precursor is applied. In the other process, a compound or an intimate mixture of (a precursor of) the active component together with a precursor of the carrier material is prepared, for example, by co-precipitation or fusion. Upon a thermal treatment this gives the combination of the active component on the carrier. This second method generally has to be used when the carrier has to be heavily loaded with the active component to produce the desired catalytic properties. One disadvantage of the method in which a compound or an intimate mixture is prepared in a first step is that the porous structure of the catalyst cannot be properly controlled. The pores in the ultimate catalyst are often too narrow, while the active component is often poorly accessible. The first process, which starts with a existing carrier, to which the active component is applied, does not have this disadvantage. The carrier can be selected so as to meet the requirements of the catalytic reaction to be performed. Here, however, it is difficult to realize the desired distribution of the active component over the carrier surface.

In the production of technical catalysts, it is tried to remedy the above disadvantages as much as possible, nearly always without obtaining a catalyst which satisfies all of the requirements. Thus, in the preparation of catalysts in which the carrier is densely laden, it is virtually impossible to realize the desired distribution of the active component over the carrier surface, starting from an existing carrier. Indeed, in many cases, these catalysts are produced through thermal decomposition of a compound or mixture of precursors of carrier and active components. Examples are catalysts for the synthesis of ammonia and methanol, for the methanesteam reforming reaction, and for the carbon monoxide shift conversion reaction. In these cases, however, the pore structure of the ultimate catalyst is not under control. For this reason, less densely laden catalysts will preferably be produced by the process in which an existing carrier is provided with an active component.

It is, however, highly desirable that catalysts with more densely laden carriers, too, can be prepared using an existing carrier, and without the distribution of the active component becoming so inhomogeneous as to substantially detract from the activity of the catalyst. About 20 years ago, therefore, the deposition-precipitation technique was developed. In it, an existing carrier material is suspended in a solution of a precursor of the active component. Subsequently, the concentration of an insoluble precursor of the active component in the solution is increased homogeneously and in a controlled manner. The insoluble precursor is selected so that its nucleation on the surface of the carrier proceeds preferentially to nucleation in the solution. A homogeneous and controlled increase of the concentration of the insoluble precursor then effects precipitation of the active component solely on the surface of the carrier. As, during precipitation, the solution is kept homogeneous, no transport problems occur, and as a consequence the active precursor is uniformly deposited on the carrier surface.

For the homogeneous and controlled increase of the concentration of an insoluble precursor of the active component, a number of effective methods have been developed. The precipitation is caused to proceed by changing the pH-value of the solution;

changing the valency of a precursor of the active component;

converting an agent forming a soluble complex with a precursor of the active component into a non-complexing compound.

(cf. J.W. Geus in "Preparation of Catalyst III", P. Poncelet, P. Grange and P. A. Jacobs eds., pp. 35–45, Elsevier Amsterdam 1983; also cf. Van Dillen, A. J., Geus, J. W., Hermans, L. A. M., Van der Meyden, J. in "Proc. 6th Int. Congr. on Catal. London, 1976 (Bond, G. C., Wells, P. B., Tomplins, F. C. eds.) Vol. 2, pp. 677 The Chemical Society, London 1977).

The homogeneous solution required for deposition-precipitation can be realized in two different ways. In accordance with a first method, solutions of the reactants required for the desired reaction are mixed at a temperature at which the desired reaction does not proceed or at a low rate only. When the solution in which the carrier material is suspended has become homogeneous, the reaction is caused to proceed by increasing the temperature. Examples are increasing the pH value of solutions by the hydrolysis of urea or of ammonium cyanate, or by the auto-oxidation-reduction of nitrite, the conversion or iron(II) into iron(III), whose solubility is lower, by oxidation with nitrate, the reduction of silver ions with formalin or glucose, and the hydrolysis of complexing cyanide ions. A technical advantage of this method is that no problems occur when the scale is increased. Owing to proceeding from a homogeneous solution, and owing to the mixing of the reactants and the performance of the reactions being separated, the volume in which the reaction(s) is or are carried out does not play a role. In certain cases, however, this method cannot satisfactorily be used. In the first place, it frequently occurs that no feasible easy reaction is available that leads to the desired change in concentration. One example is the decrease in the pH value of a suspension of a carrier in a solution of an active precursor. In this way, in principle, a series of catalytically interesting compounds can be precipitated, such as zinc hydroxide, aluminum hydroxide, lead oxide, molybdenum oxide and vanadium oxide. However, a suitable, cheap reactant which upon an increase in temperature leads to a reaction in which the pH is decreased, is not available. Another disadvantage is that the reaction rate cannot be sufficiently increased by increasing the temperature to achieve production rates technically necessary for relatively cheap catalysts. It has been proposed to use elevated pressures in such cases, so that the boiling point of the solution no longer limits the temperature, but that method, too, is relatively expensive and cumbersome. A last example in which the above method has disadvantages are cases in which the interaction of a precipitating compound with the surface of a given carrier is only sufficiently strong to lead to deposition-precipitation in a given pH range.

The drawbacks have led to the development of a second form of deposition-precipitation. In it, a solution of a precipitating agent is injected below the surface of a suspension of the carrier in a solution at a place where mixing proceeds rapidly, for example, by providing for a large velocity gradient. Because high shear stresses cannot applied at the surface of the liquid, it is necessary for the reactant to be injected below the surface of the liquid. Here again, a number of different embodiments are possible. A solution of a precursor of an active material can be injected into a suspension of the carrier whose pH value is maintained at a constant value by the hydrolysis of urea. The rate of injection is controlled so that the pH value remains within a given range. This method is used, if there is only a sufficient interaction of the precipitate with the carrier within a given, limited pH range. It is also possible to keep the pH value within a given range by simultaneously injecting an acid or alkaline solution. On the other hand, it is also possible to inject a solution of a precipitate in a suspension of the carrier in a solution of the active precursor.

With this second form, an increase in scale is more difficult. With increasing volumes, intensive agitation of the suspension is going to present problems. The suspension must then be (re)cycled slowly through a small, intensely stirred reaction volume. With an increasing scale, the cross-sectional area of the injection pipe(s) is also becoming critical. Diffusion or sucking back of the suspension of the carrier must decidedly be avoided. On the other hand, with a small area of the injection pipe(s), when no problems occur, the production rate often becomes prohibitively low.

To broaden the area where deposition-precipitation is technically feasible, a process in which the above problems are not encountered would be highly attractive. The present invention was accordingly based on the problem of providing a technically feasible method of using deposition-precipitation in a broad field, avoiding the use of expensive reactants and/or those that are difficult to handle, in which the production rate can be controlled, and in which the above reactions suitable for deposition-precipitation can be used.

British patent No. 531,105 describes the electrochemical preparation of an insoluble hydrated nickel compound as a paste, which subsequently can be converted into a form suitable for catalytic hydrogenation reactions. Accordingly, the systems thus produced only contain an active material and, possibly a promotor, but no carrier. The object of the present invention, on the other hand, is to provide a process for preparing catalysts on carrier systems.

According to the present invention, it was found that the homogeneous and controlled increase in concentration of a poorly soluble (precursor of an) active component, required for deposition-precipitation, under such conditions that there will be a sufficient interaction with the carrier can be achieved by electrochemical means. It was further found that for the preparation of a catalyst not only can a suspension of the carrier material as such be used as the starting material, but so can a solution of a precursor for the carrier material, which is then converted into the carrier material by means of an electrochemical reaction. This latter reaction can be performed prior to, or simultaneously with, the electrochemical precipitation of the active component.

It is noted that French patent No. 1,283,711 describes a process in which, by means of an electrochemical reaction, a catalytically active material is produced in the form of a co-precipitate of metal (hydr)oxides or of metal salts. The catalysts thus produced, however, have the same drawbacks as conventional catalysts produced by means of co-precipitation, as described hereinbefore.

In one embodiment of the process according to the present invention, the deposition-precipitation is realized by placing or generating a suspension of the carrier in a solution of the precursor of the active component in the anode or cathode compartment of an electrochemical cell, and passing an electrical current through the cell. In a particularly suitable embodiment of the process according to the present invention, the pH value of a suspension of the carrier in a solution of a precursor of the active component is decreased by introducing the suspension into the anode compartment of an electrochemical cell and passing an electrical current through the cell.

At the anode, at high pH values the following reaction takes place:

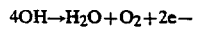

and at lower pH values the following reaction takes place:

$$6H_2O \rightarrow 4H_3O^+ + O_2 + 4e^-.$$

In order to prevent that hydroxyl ions produced at the cathode by the reaction:

$$2H_2O + 2e^- \rightarrow H_2 + 2OH^-$$

(partially) undo the desired decrease in pH, the anode compartment is separated from the cathode compartment, for example, by a salt bridge, or a porous membrane.

A great advantage of the process according to the present invention is that the use of expensive and corrosive chemicals is minimal. Thus sodium chloride or sodium nitrate can be used to compensate for the charges removed by the electrochemical reaction.

In another, highly suitable embodiment of the process according to the present invention, the pH value of a suspension of the carrier in a solution of a precursor of the active component(s) is increased by introducing this suspension into the cathode space of an electrochemical cell, and passing an electrical current through the cell. In this way precipitation is produced by increasing the pH value.

At the cathode, the following reactions take place respectively at low and high pH values:

$$2H_3O^+ + 2e^- \rightarrow H_2 + 2H_2O$$

and $$2H_2O + 2e^- \rightarrow H_2 + 2OH^-.$$

The hydrogen thus produced is highly pure and can easily be separated. As the metal applied to the carrier often has to be reduced, the hydrogen can in many cases be used in the catalyst production.

In some cases, precipitation of the active precursor takes place at such pH values that during the electrolysis there is the risk that a precipitate of the metal to be applied to the carrier is formed on the cathode. In this connection reference can be made to European patent application No. 106,197, which describes a method of depositing catalytically active metals, such as platinum, palladium, or silver, on an electrode. Because, in the process according to the present invention, this should be avoided as much as possible, it is of advantage, when during the electrolysis there is the risk that a precipitate of the metal to be applied to the carrier is formed on the cathode, to use one or several cathodes which, for example by electrochemical means, has been coated with a layer of chromium oxide, which effectively prevents the electrochemical deposition of the active component or a precursor of the active component on the cathode. The chromium oxide can be applied to the cathode, for example, by placing it, with a suitable anode, in a chromate or bichromate containing solution and passing current through the cell thus produced for a short period of time.

In a particular variant of the process according to the present invention, to avoid undesirable reactions of the ion to be precipitated at one of the electrodes, a membrane permeable to hydrogen ions or hydroxyl ions is placed between one of the electrodes and the suspension of the carrier in a solution of a precursor of the active component. Preferably, a membrane that is only permeable to hydroxyl ions is placed between the anode and the suspension of the carrier in a solution of a precursor of the active component, and/or, a membrane substantially permeable to hydrogen ions only is placed between the cathode and said suspension. Suitable membranes are described, for example, in Netherlands patent applications Nos. 7502762 and 8101874, and also in U.S. Pat. No. 3,506,635. These are generally perfluorocarbon membranes provided with ion exchanging groups. Very good results have been obtained with membranes marketed by E.I. du Pont de Nemours under the trademark Wafion ®.

As stated before, in addition to the application of catalytically active components to carrier materials, the process according to the present invention can be used for generating the carrier in situ in the vessel where the further reactions are to take place. This applies to the carrier materials which are the most important in catalysis, namely, silicon dioxide and aluminum oxide, but also to a number of other carrier materials less frequently used, such as zinc oxide. For the preparation of carriers containing a combination of these components, too, the process according to the present invention is excellently suitable. In this connection the production of silicon dioxide carriers may be mentioned in particular. Suitable silicon dioxide carriers are commonly prepared by treating water glass (sodium silicate) solutions with an acid (commonly sulfuric acid). A great problem here is that the silicon dioxide formed is rapidly gelated. In that case it is difficult to work on a large scale. Good and fast distribution of the acid added is extremely difficult. An injection pipe installed under the surface of the water glass containing solution is rapidly clogged, while the addition of the acid above the solution leads to gel formation. According to the state of the art, it is tried to prevent the formation of unmanageable gels by intense stirring, when the gel formed is broken by being pressed through a metal wire gauze placed in the precipitation vessel.

Because at the anode the formation of hydrogen ions is much better to control and the surface area of the electrode can be made sufficiently large to ensure a rapid distribution of the hydrogen ions formed through the solution, the electrochemical method according to the present invention is excellently suitable for the production of silicon dioxide containing carriers from water glass. It will be clear that, depending on other substances present in the reaction medium, such as, for example, aluminum ions, aluminum oxide, etc., it is possible to produce carrier materials in this way which by themselves have catalytic or zeolite properties.

In the preparation of metal catalysts, the starting product is often the metal as such. This applies in particular to copper and iron catalysts. These metals are relatively inexpensive, so that they are usually not recovered from spent catalysts. Before the metal can be applied to a carrier, it has to be dissolved in an acid, such as sulfuric acid, hydrochloric acid or nitric acid. Apart from the use of acid and the special (corrosion-resistant) apparatus required for this, the operation is often time-consuming. Furthermore, gaseous compounds generated during the dissolution of the metal often lead to environmental problems. To avoid these, additional - relatively expensive - provisions are necessary.

Using a variant of the process according to the present invention, the disadvantages outlined above can be prevented. According to this variant, use is made of one or a plurality of anodes consisting in full or in part of the metal to be precipitated. Good results are also obtained with smaller metal particles provided in a net of a polymer (Teflon). Now the metal is dissolved at the anode, while at the cathode the pH is increased. By stirring, it is accomplished that the two reactions proceed in a space between anode and cathode. In this case, therefore, no membrane or salt bridge between anode and cathode is required. In this implementation of the process according to the present invention, the concentration of the metal ions is varied little. As a consequence, the precipitation can be well controlled. By adjusting the pH to a value at which the metal ions concentration is low, the discharge of the metal ions on the cathode can be prevented. In that case, the hydrogen ions exchanging membrane need not be used. This has advantages for the rate of production: the resistance of the membrane need not be overcome. In this implementation of the process according to the invention the consumption of chemicals is relatively low. Precipitants such, for example, as soda, are unnecessary, and, consequently, the laden carrier does not need thorough washing. In cases where alkali metal ions poison the catalyst, and therefore have to be removed by thorough washing, this method is also highly attractive. As no reactants are added, after the laden carrier has been filtered off, the filtrate can be re-used for a next batch. In this way, waste water problems are avoided, while no metal is lost.

The process according to the invention can also be excellently used for the production of mixed oxide or alloyed catalysts. In that case one or more electrodes of each of the metals to be precipitated is or are installed in the anode space of the cell. During the passage of current, the voltage is applied periodically to the electrode(s) of a given metal in accordance with a pre-determined programme. By controlling the time and the voltage across the electrode of a given metal, the metal ions can be precipitated on the carrier in a desired ratio. Generally speaking, it is difficult to apply active components uniformly, and in finely-divided form, to the surface of a carrier in a desired ratio.

The process according to the present invention can also be suitably used for decomplexing in homogeneous solution. In particular, in such a process, a complexing agent can be oxidized anodically. As, in this way, the oxidation can be well-controlled, the deposition-precipitation can be carried out under well-controlled conditions.

One aspect of the process according to the invention particularly relates to the adaptation of the compound(s) to be precipitated to the conditions required for deposition-precipitation to ensure a sufficient interaction with the carrier. In fact, in a number of important cases, metal ions are precipitated under conditions in which the interaction with the carrier is insufficient to lead to preferential nucleation on the carrier. In such a case it is necessary to take particular measures. One example is the precipitation of copper(II) and iron(III); these ions are precipitated at such a low pH value that the interaction with a silicon dioxide carrier is insufficient to lead to adherence to the carrier surface. In these cases, the difficulties which occur can be overcome by changing the valency of the metal. Thus iron(II) and copper(I) are only precipitated at higher pH values. For this reason these metal ions when precipitated do adhere to silicon dioxide carriers. Similar situations occur with vanadium(V) and molybdenum(VI) ions which exhibit an acid reaction. As a result the interaction with silicon dioxide is insufficient to lead to preferential nucleation on the carrier.

For still another reason it is desirable to adjust the valency of the ions to be precipitated, namely, in cases in which the active catalyst material consists of more than one component, and in which the order of precipitation of the several ions to be precipitated is of importance. Thus for certain copper-nickel catalysts, it is desirable that first the nickel and then the copper be applied to the carrier. As basic copper(II) salts are less soluble than basic nickel salts or nickel hydroxide, this is not possible without further ado. For this purpose the application of the active precursors can be carried out in two separate stages, but this is cumbersome.

It has now been found that the process according to the present invention can be excellently used to adjust the valency of ions in such a manner that the interaction with the carrier required for deposition-precipitation occurs. Thus, at a lead electrode, vanadium(V) can be readily reduced to vanadium(III). In a relatively simple electrochemical cell, the exclusion of air oxygen to prevent re-oxidation is easy. According to this embodiment of the process according to the present invention, therefore, prior to the actual deposition-precipitation the valency of the ions to be precipitated is adjusted so that the interaction with the carrier surface desirable for preferential nucleation on the carrier occurs.

Furthermore, this embodiment of the invention makes it possible for the precipitation of nickel(II) and copper(I) ions to be combined. In this way the precipitation can be effected in one step.

The invention is illustrated in and by the following examples.

EXAMPLE I

Precipitation of an aluminum (hydr)oxide carrier by decreasing the pH value and deposition precipitation of zinc (hydr)oxide on this carrier In this example, first aluminum (hydr)oxide is precipitated in accordance with the present invention. In a next step, zinc hydroxide is deposited on this aluminum (hydr)oxide by the process according to the present invention. The aluminum (hydr)oxide precipitated in the first step can also be used as such for certain catalytic reactions without applying a different active component to its surface.

The starting product was 10 g $Al(NO_3)_3.9H_2O$, which was dissolved in 150 ml water. Using sodium hydroxide, the pH was subsequently adjusted to 11; an intermediate precipitate was fully dissolved.

The resulting solution was introduced into a glass beaker with a magnetic stirrer. In the beaker, a closed-bottom, cylindrical pot of porous porcelain was placed. Provided within this porous pot was a platinum electrode. The solution contained in the glass beaker was connected through a salt bridge (ammonium nitrate in agar) to another glass beaker also containing a platinum electrode. Across the two electrodes a voltage of about 30 V was applied; this resulted in an amperage of about 400 mA. During the passage of current, the pH of the aluminum solution gradually decreased to 8.6, whereby precipitation of aluminum hydroxide was observed. After 2.5 hours, the aluminum had precipitated virtually entirely.

Subsequently, the platinum electrode in the porous pot was replaced by a zinc electrode, whereafter electrolysis was continued. The zinc ions dissolved at the zinc electrode slowly diffused through the porous pot and precipitated on the suspended aluminum oxide. Just as in the precipitation of the aluminum (hydr)oxide, the voltage applied was 30 V and the resulting amperage 400 mA. Electrolysis was discontinued after 30 min.

The zinc oxide laden aluminum oxide was separated from the liquid, washed and dried. After calcination for 6 hours at 700° C., an X-ray diffraction pattern was taken of a sample of the material. The diffraction pattern indicated the presence of ZnO on gamma-$Al_2O_3$.

EXAMPLE II

Deposition-precipitation of zinc hydroxide on suspended aluminum oxide 0.7 g zinc oxide was suspended in 800 ml water. The zinc oxide was dissolved by adding potassium hydroxide; at a pH value of 12.5, all zinc was dissolved. Subsequently, the pH was reduced to 10.0 by adding hydrochloric acid. The solution remained clear. Finally, 2.5 g gamma-$Al_2O_3$ (107 $m^2/g$) was suspended in the solution thus produced.

The suspension was prepared in a glass beaker containing a platinum mesh electrode having a surface area of 225 $cm^2$. The solution was connected through a few salt bridges (ammonium nitrate in agar) to a cathode compartment containing 500 ml 1N hydrochloric acid, and in which a platinum anode having a surface area of 4 $cm^2$ was mounted.

A voltage of 30 V was applied across the platinum electrodes; this produced an amperage of about 200 mA. In the anode compartment, the pH value gradually decreased to 6.5, whereby the zinc was precipitated. After 2 hours the zinc had precipitated virtually entirely.

The laden gamma-$Al_2O_3$ was separated from the liquid, washed and dried for several hours at 1200° C. X-ray diffraction patterns and thermogravimetry showed that in the dried preparation $Zn(OH)_2$ and gamma-$Al_2O_3$ were present. Loading was 30% by weight of $Zn(OH)_2$.

A portion of the laden carrier material was calcined at 500° C. for 5 hours. The resulting material was investigated in the electron microscope, and its X-ray diffraction pattern was taken. It was found that small zinc oxide particles had deposited on the aluminum oxide. The average particle size of the zinc oxide was 10 nm.

EXAMPLE III

Deposition-precipitation of nickel hydroxide on silicon dioxide

In this case the deposition-precipitation was carried out in a reactor having the form of a horizontal cylinder. The glass cylinder was vertically divided into two parts, between which a hydrogen ions exchanging membrane could be fixed. The diameter of the cylinder was 11.5 cm.

The anode compartment was filled with about 1 l water. Its pH was adjusted to 3.5 with hydrochloric acid, whereafter 50 ml of a nickel chloride solution (99.7 g/l) was added. Subsequently, 5 g of silicon dioxide (Aerosil, Degussa FRG 380 $m^2/g$) was suspended in the solution, and also glass pearls with a diameter of 4 mm. These glass pearls served to prevent the deposition of the laden carrier on the membrane.

The cathode compartment was filled with about 1 l potassium hydroxide having a pH value of 13. As anodes were used nickel rods (diameter 6 mm and purity higher than 99%) having a total area of about 100 $cm^2$. The negative electrode was a platinum mesh electrode having a surface area of about 225 $cm^2$.

Using a thermostat, the temperature of the liquids in the cylinder was maintained at about 90° C. During the electrolysis, the voltage was maintained at about 2.5 V; amperage was about 100 mA. During the electrolysis the liquid in the anode compartment was vigorously stirred.

The degree of loading of the carrier can be controlled by means of the duration of the electrolysis. After separation of the laden carrier from the anolyte, a next deposition-precipitation can be carried out with the same liquid. This only requires suspending silicon dioxide in the solution. In fact, nickel hydrosilicate is the only compound precipitated without other compounds being consumed.

After the laden carrier had been separated from the liquid and dried at 120° C., the material was examined in the electron microscope. Calculated on the metallic nickel, the degree of loading of the carrier was 20% by weight. The resulting catalyst was compared with a catalyst produced in accordance with the state of the art by hydrolysis of urea at 90° C. It was found that the two catalysts were indistinguishable. In both cases the silicon dioxide had reacted with the precipitating nickel to form extremely thin nickel hydrosilicate platelets.

EXAMPLE IV

Deposition-precipitation of (hydrated) iron oxide on silicon dioxide

In this example, use was also made of the reactor in the form of a horizontal cylinder as described in Example III. The anode compartment was filled with about 1 l water in which 4 g silicon dioxide (Aerosil, Degussa, FRG 380 $m^2/g$) was suspended. 5 Iron electrodes (rod electrodes with a diameter of 6 mm) were introduced into the liquid. The pH of the anolyte was adjusted to a value of 2.5 with nitric acid. The deposition of the laden carrier on the ion exchanging membrane was prevented by suspending a few glass pearls (diameter 4 mm) in the liquid and vigorously stirring during the electrolysis.

The cathode compartment was filled with 1 l water whose pH was adjusted to 13 with potassium hydroxide. Mounted in the cathode compartment was a platinum mesh electrode having a surface area of 225 $m^2$.

Across the electrodes a voltage of 7 V was applied, which gave a current of about 200 mA. Initially the amperage was about 400 mA. Over about 20 hours, the pH value of the anolyte increased to 4.5, whereafter the electrolysis was discontinued.

The laden carrier was separated from the liquid, washed and dried. Calculated on metallic iron, the degree of loading of the carrier was 25% by weight.

EXAMPLE V

Deposition-precipitation of nickel (hydr)oxide on silicon dioxide

In this example, the precipitation of nickel ions was carried out without using an ion exchanging membrane. The electrochemical deposition of nickel on the cathode was prevented by plating this electrode according to the invention with a chromium oxide layer. The application of the chromium oxide plating was carried out as follows: 0.6 g $K_2Cr_2O_7$ was dissolved in 100 ml water. In this solution a platinum mesh electrode with a surface area of 225 cm² was placed, and a nickel bar with a surface area of 10 cm² served as the counterelectrode.

A voltage of 2 V was applied across the electrodes, which produced an amperage of 40 mA. After 16 hours of electrolysis, the negative platinum electrode is provided with a protective chromium oxide layer.

EXAMPLE VI

The preparation of silicon dioxide from a water glass solution

For this example the starting product was a water glass solution containing 28.4% by weight of $SiO_2$ and 8.7% by weight of $Na_2O$. The $SiO_2/Na_2O$ weight ratio is 3.25 and the density of the solution 1.39 g/ml.

2.5 ml of this solution was diluted with water to 50 ml. The pH value of the solution was 11.5. The thus diluted solution was introduced into a glass beaker containing in addition to a magnetic stirrer a platinum electrode having a surface area of 4 cm² and a pH electrode. By means of a salt bridge (ammonium nitrate in agar) the solution was connected to 300 ml of 1 N hydrochloric acid contained in a glass beaker. In it, a platinum electrode with an area of 1 cm² was provided.

A voltage of about 30 V was applied across the platinum electrodes, which resulted in a current of 100 mA. The electrochemical production of hydrogen ions in the water glass solution caused the pH to be slowly decreased to 7.7. At a pH value of 9.5 some turbidity was already visible. When a pH value of 7.7 was reached, the electrolysis was discontinued. It was found that the suspension was not gelated until after 18 hours. When in another experiment the pH value was electrochemically reduced to 7.4, gelation immediately occurred. Accordingly, in the process of the present invention, gelation can be fully controlled.

The turbid solution produced at a pH value of 7.7 was evaporated and subsequently dried at 120° C. for 17 hours. During evaporation the suspension was gelated. The dried material had a BET surface area of 82 m²/g.

EXAMPLE VII (A) Preparation of vanadium(III).

The electrolysis vessel used was made of Pyrex glass and had a volume of about 1.5 l. Centrally within the vessel a closed-bottom porous porcelain cylindrical pot was mounted. Arranged in this porous pot was a carbon electrode, which during the electrolysis functioned as an anode. Arranged on the outside of the porous pot was a hollow tubular lead electrode, through which a stream of cooling water was passed.

Nitrogen was bubbled through the solutions placed in the electrolysis vessel to exclude air oxygen. The electrolysis vessel was closed at the top. The liquid in the electrolysis vessel could be intensely stirred with a magnetic stirrer.

In addition to the current carrying electrodes, a pH electrode and a calomel and platinum electrodes were placed in the solution. The last electrode was used to follow the potential of the solution.

To prepare vanadium(III), 0.4 mole of $VOSO_4.5H_2O$ (Merck p.a.) was dissolved in the above vessel in about 700 ml demineralized water that had been boiled and then cooled. Using concentrated sulfuric acid, the pH of the solution was adjusted to 0.5. In the porous pot, deionized water was placed. This water was acidified with sulfuric acid until further acidification had no further effect on the current intensity. During the reduction, the current intensity was about 2.1 A, and the voltage 8.2 V. In this case the efficiency of the electrolysis to trivalent vanadium wasw 51%.

(B) To the solution obtained under (A) so much silicon dioxide (Degussa, FRG, specific area 200 m²/g) was added that a degree of loading of 25% by weight of $V_2O_3$ resulted.

Subsequently the pH value was increased electrochemically, whereby hydrogen was generated at the cathode. At a pH value of 5, precipitation of trivalent vanadium on the carrier was obtained.

EXAMPLE VIII

Preparation of a nickel oxide/vanadium oxide catalyst 100 ml of a vanadium(III) solution, prepared as described in Example VIIA, was placed in a precipitation vessel and, under nitrogen, supplemented with 200 ml distilled water. Using concentrated sulfuric acid, the pH was adjusted to a value of 1.0, whereafter 1.88 g $NiSO_4.6H_2O$ was dissolved. Subsequently, the pH was increased to a value of 8 by electrochemical means (hydrogen generation at the cathode). At this pH, the formation of precipitate was complete. The precipitate was filtered off and washed with hot water under such conditions as to prevent oxidation. Subsequently, the precipitate was dried at 115° C. for 20 hours, then pulverized and again dried at 125° C. for 24 hours.

EXAMPLE IX

Preparation of an $Ni/V_2O_3/SiO_2$ catalyst 150 ml of a vanadium(III) solution (0.045 mole), prepared as described in Example VII A, was placed in a precipitation vessel and made up to 200 ml with deionized water. Thereafter, 12.78 g of $NiSO_4.6H_2O$ was dissolved and subsequently 6.42 g of silicon dioxide (Aerosil, Degussa FRG 200 m²/g) were suspended in the solution. Subsequently, the pH was increased to a value of 8 by electrochemical means (hydrogen generation at the cathode). The loaded carrier thus obtained was filtered off, washed with hot water, dried at 120° C. for 24 hours, pulverized, and again dried at 120° C. for 24 hours.

EXAMPLE X

Preparation of an $Fe/V_2O_3/SiO_2$ catalyst

In the same way as described in Example IX, but starting from 13.5 g of $FeSO_4.7H_2O$, an $Fe/V_2O_3/SiO_2$ catalyst was prepared.

EXAMPLE XI

Production of a nickel-on-silicon dioxide catalyst

Nickel-on-silica catalysts were produced in accordance with the present invention by electrochemical deposition-precipitation. The precipitation was carried out in a double-walled vessel with a volume of 2 l. Water was circulated in the jacket of the vessel, which by means of a thermostat was kept at a pre-determined temperature. As a consequence, the precipitation of the nickel could be carried out at a temperature to be selected from 0° to 100° C. One advantage of the use of such a vessel is that the measurement of the pH is not affected by spurious electrical signals from heating elements arranged on the vessel. The vessel was provided with baffles and a stirrer for establishing a turbulent flow pattern in the vessel. The electrolytic section consisted of a source of voltage, an ammeter, two (solid)

nickel electrodes connected as anodes, and two cylindrical platinum mesh electrodes. The surface area of the nickel electrodes was approximately 30 cm² and that of the platinum electrodes about 225 cm². In a separate process step, the two platinum electrodes had been provided one by one with a chromium (hydr)oxide plating. This was effected by electrolyzing a potassium dichromate solution at an amperage of 10 mA and a voltage of −1.0 V relative to a nickel electrode for 16 hours. This plating of chromium (hydr)oxide serves to delay the reduction of nickel ions at the cathode.

During the loading of the silicon dioxide carrier with nickel, the nickel electrodes were placed within the cylindrical platinum electrodes. Subsequently, 6 g of silicon dioxide (Degussa, Federal Republic of Germany, "Aerosil 380 V", area about 380 m²/g) was suspended in 1.8 l of demineralized water, in which 2.0 g of potassium chloride had been dissolved to increase the electrical conductivity. The pH of the suspension was adjusted to 6.0 by means of a potassium hydroxide solution. The suspension was placed in the electrolytic vessel and the stirrer was started.

After the temperature of the suspension had been brought to 363° K., a voltage of 7 V was applied across the two cells, which were connected in parallel. The resulting current was 400 mA. Nickel ions were then anodically dissolved, while at the cathode hydroxyl ions were generated in the solution owing to the formation of gaseous hydrogen. Under these conditions the nickel precipitates from homogeneous solution. The hydrolysis can be stopped when the carrier had been loaded with the desired quantity of nickel. As all nickel is deposited on the carrier, and there is no generation of oxygen at the anode, the deposition of the desired quantity of nickel can be determined from the amperage and the period of electrolysis.

After the electrolysis had been stopped, the loaded carrier was separated from the liquid and thoroughly washed. As the loaded carrier settles rapidly, this washing can be effected, if desired, by decanting and, after adding water, re-stirring the suspension. An examination in the electron microscope showed that the carrier had reacted with the nickel to form thin platelets of nickel hydrosilicate. After reduction, the catalyst thus produced contains nickel particles with an average diameter of 5 nm. The reduced catalyst exhibits a high activity for the hydrogenation of carbon monoxide to methane. Both in structure and in catalytic properties the catalyst produced is indistinguishable from nickel-on-silica catalysts produced by the deposition-precipitation by the hydrolysis of urea. There are, however, no difficulties with waste water in this electrochemical production process.

EXAMPLE XII

Production of a copper-on-silica catalyst

Copper-on-silica catalysts were produced in accordance with the present invention by electrochemical deposition-precipitation. The precipitation was carried out in a double-walled vessel with a volume of 2 l. In the jacket of the vessel, water was circulated, which by means of a thermostat was kept at a pre-determined temperature. This made it possible for the precipitation of the nickel to be carried out at a temperature to be selected from 0° to 100° C. One advantage of the use of such a vessel is that the measurement of the pH is not affected by spurious electrical signals from heating elements provided on the vessel. The vessel was equipped with baffles and a stirrer for establishing a turbulent flow pattern in the vessel. The electrolytic section consisted of a source of voltage, an ammeter, one (solid) copper electrode connected as an anode, and one cylindrical platinum mesh electrode. The area of the copper electrode was about 30 cm² and that of the platinum electrode about 225 cm². In this case the platinum electrode was not previously plated with a layer of chromium (hydr)oxide.

In 1.8 l demineralized water, 10.0 g silicon dioxide (Degussa, Federal Republic of Germany, "Aerosil 380 V", area about 380 m²/g) was suspended. As a charge carrier, either potassium sulfate or potassium nitrate was dissolved in the suspension. Subsequently the pH value of the suspension was adjusted with acid to 4.0.

A voltage of 7 V was used. The amperage was 600 mA when potassium nitrate was used as the conductive agent and 700 mA when potassium sulfate was used. Owing to the low copper concentration in the solution, the reduction of copper ions on the platinum cathode is minimized. At an initial pH value of 4.0 and the above low copper concentration, the precipitation of alkaline copper salts, which adhere poorly to the carrier, and give rise to large crystallites, is prevented. The process according to the invention generally makes it possible to follow the procedure here described, namely, precipitation at a fixed selected pH value and a fixed selected concentration of the ions to be precipitated. By virtue of this the precipitation process can be excellently controlled. This is of importance for many metal ions. After the desired degree of loading had been reached, the loaded carrier was separated from the liquid, washed with water and dried at 120° C. After reduction at about 250° C., an examination in the electron microscope showed that the catalyst contained copper particles of about 5 nm.

EXAMPLE XIII

Production of a copper-nickel alloy catalyst on a silica carrier

The process according to the present invention lends itself excellently to the production of alloy catalysts. This is illustrated by the production of a copper-nickel alloy catalyst, in which small alloy particles are applied to a silica carrier.

The precipitation was carried out in a double-walled vessel with a volume of 2 l. In the vessel's jacket, water was circulated, which by means of a thermostat was maintained at a pre-determined temperature. As a result it was possible for the precipitation of the nickel to be carried out at a temperature to be selected from 0° to 100° C. One advantage of the use of such a vessel is that the measurement of the pH is not affected by spurious electrical signals from heating elements provided on the vessel. The vessel was equipped with baffles and a stirrer for establishing a turbulent flow pattern in the vessel. The electrolytic section was made up by a source of voltage, an ammeter, one (solid) copper electrode, one solid nickel electrode, both connected as anodes, and two cylindrical platinum mesh electrodes. The area of the copper and nickel electrodes was about 30 cm² and that of the platinum electrode about 225 cm². In a separate process step, the two platinum electrodes had been provided one by one with a layer of chromium (hydr)oxide. This was effected by electrolyzing a potassium dichromate solution at a current of 10 mA and a voltage of −1.0 V relative to a nickel electrode for 16 hours.

This chromium (hydr)oxide plating serves to delay the production of nickel and copper ions at the cathode. In 1.8 l demineralized water, 10.0 g silicon dioxide (Degussa, Federal Republic of Germany, "Aerosil 380 V", area about 380 m$^2$/g) was suspended. Potassium sulfate was used as a charge carrier. Previously, the pH value of the suspension was adjusted to 4.5 and the temperature was brought to 363° K.

The electrolysis can be carried out in three ways. It is possible to connect both the nickel and the copper anode to an independent source of voltage and allow the precipitation to proceed simultaneously. The applied voltages were 2.5 or 4.0 V, which led to amperages of 200 or 300 mA. It is also possible first to connect the nickel electrode separately as an anode and then the copper electrode on the other way round. Thus in one experiment, first nickel was electrolyzed until the carrier was loaded with approximately 10% by weight, whereafter 10% by weight of copper was electrolytically applied to a suspended silicon dioxide carrier. In another experiment 10% by weight of copper and then 10% by weight of nickel were precipitated on a suspended silica carrier.

After loading, the carriers were separated from the liquid and washed. The catalysts were reduced at about 400° C. An examination in the electron microscope showed that small alloy particles had been deposited on the carrier; the size of the alloy particles was about 5 nm. The effective admixture of copper and nickel in the catalysts thus produced is apparent from the considerably faster reduction of the nickel in the catalyst. It is found that, in temperature-programmed production experiments, the nickel is reduced at a much higher rate than in catalysts containing nickel only. This indicates that hydrogen atoms formed on copper can quickly migrate to nickel ions. Magnetic measurements, too, show the formation of alloy particles.

EXAMPLE XIV

The production of silica carriers from water glass

In this case the starting product was a water glass solution containing 28.4% by weight of silicon dioxide and 8.7% by weight of Na$_2$O. The weight ratio of SiO$_2$/Na$_2$O was 3.25 and the density of the solution 1.39 g/ml.

2.5 ml of this solution was diluted with water to 50 ml. The pH value of the solution thus diluted was 11.5. The solution was placed in a glass beaker in which, in addition to a magnetic stirrer, a platinum electrode with an area of 4 cm$^2$ and a pH electrode had been placed. The water glass solution was connected via a salt bridge (ammonium nitrate in agar) to 300 ml 1 N hydrochloric acid in a glass beaker. Placed in the hydrochloric acid was a platinum electrode with an area of 1 cm$^2$.

A voltage of 35 V was applied across both platinum electrodes. This gave an amperage of 100 mA. Owing to the production of hydrogen ions in the water glass solution, the pH value slowly decreased to 7.7. It was only after 18 hours that the solution obtained in this way was found to gelate. In another experiment the pH value was reduced by the electrochemical reaction to 7.4. In this case gelation occurred immediately. Accordingly, gel formation can be fully controlled in the process according to the present invention. The addition of acid, in accordance with the state of the art, leads to gel formation. The resulting gels are difficult to break. Generally speaking, therefore, first the pH value is greatly decreased, and thereafter (slowly) increased again by adding lye.

The turbid solution obtained at a pH value of 7.7 was evaporated and then dried at 120° C. for 17 hours. During the evaporation the suspension was gelated. The dried material exhibited a BET area of 82 m$^2$/g.

EXAMPLE XV

Coating aluminum oxide carriers with zinc oxide

In a 2-l 3-necked flask, 0.7 g zinc oxide was dissolved in nitric acid, whereafter the volume was made up with demineralized water to 800 ml. In the solution thus obtained, 5.4 g gamma aluminum oxide was suspended. This solution was placed in a glass beaker, whereafter a platinum electrode was installed. The solution was connected to a hydrochloric acid solution by means of a salt bridge. The solutions were maintained at a temperature of 298° K.

By generating hydrogen in the suspension, the pH value was increased homogeneously from 4, the value at which the suspension had been previously adjusted, to 8. At the latter value the zinc had precipitated virtually completely. After the precipitation of the zinc, the loaded carrier was separated from the liquid washed with water, and dried at 120° C.

Measurements of the pH value during the precipitation of the zinc without a carrier and in the presence of an aluminum oxide carrier indicated interaction between the precipitating zinc and the carrier. An examination in the electron microscope, too, indicated the occurrence of finely-divided zinc oxide in the dried and calcined catalyst.

We claim:

1. A process for producing catalysts, in which a uniformly active component or a compound to be converted into a uniformly active component is obtained or deposited on a carrier material, using deposition-precipitation, characterized in that the precipitation of the uniformly active component or the compound to be converted into the uniformly active component on the carrier material is effected by means of the electrochemical reaction, whereby the uniformly active component or the compound to be converted into the uniformly active component is homogeneously disposed over the carrier material.

2. The process as claimed in claim 1, characterized by using an electrochemical cell in which a suspension of the carrier material or a solution of a precursor for the carrier material to be converted into the carrier material by means of the electrochemical reaction is used in the presence or absence of other ions or compounds.

3. The process as claimed in claim 1, characterized by placing a suspension of the carrier material in a solution of a precursor of the uniformly active component in an anode or cathode space of an electrochemical cell, and thereafter passing an electrical current through the electrochemical cell.

4. The process as claimed in claim 3, characterized by using as the precursor for the uniformly active component a complexing agent that is anodically oxidized.

5. The process as claimed in claim 3, characterized in that, prior to the precipitation, the valency of an ion of the uniformly active component to be precipitated is adjusted electrochemically to bring about an interaction with the carrier material required for deposition-precipitation.

6. The process as claimed in claim 1, characterized by using in the electrochemical reaction a cathode previously provided with a layer of chromium oxide.

7. A process for producing catalysts, in which an active component or a compound to be converted into an active component is obtained or deposited on a carrier material, using deposition-precipitation, characterized in that the precipitation of the active component or the compound to be converted into the active component on the carrier material is effected by means of an electrochemical reaction;

said process further characterized by placing a precursor of the carrier material or a suspension of the carrier material in a solution of a precursor of the active component in an anode or cathode space of an electrochemical cell, and thereafter passing an electrical current through the electrochemical cell.

8. The process as claimed in claim 7, characterized by using an anode consisting in full or in part of a metal to be precipitated.

9. The process as claimed in claim 8, characterized by using a plurality of anodes consisting in full or in part of different metals to be precipitated, and using the plurality of the anodes alternately.

10. The process as claimed in claim 7, characterized by arranging a membrane permeable to hydrogen ions or hydroxyl ions between one of the electrodes and the suspension of the carrier in a solution of the precursor of the active component.

11. The process as claimed in claim 10, characterized by providing a membrane permeable to hydroxyl ions between the anode and the suspension of the carrier in the solution of the precursor of the active component.

12. The process as claimed in claim 10, characterized by providing a membrane permeable to hydrogen ions between the cathode and the suspension of the carrier in the solution of the precursor of the active component.

13. The process as claimed in claim 7, characterized by using in the electrochemical reaction a cathode previously provided with a layer of chromium oxide.

14. The process as claimed in claim 7, characterized by using as the precursor for the active component a complexing agent that is anodically oxidized.

15. The process as claimed in claim 7, characterized in that, prior to precipitation, the valency of the ion of an active component to be precipitated is adjusted electrochemically to bring about an interaction with the carrier material required for deposition-precipitation.

* * * * *